(12) United States Patent
Kobayashi

(10) Patent No.: US 6,898,641 B1
(45) Date of Patent: May 24, 2005

(54) NETWORK ROUTING SYSTEM AND ROUTING APPARATUS

(75) Inventor: Naofumi Kobayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 716 days.

(21) Appl. No.: 09/723,416

(22) Filed: Nov. 28, 2000

(30) Foreign Application Priority Data

Apr. 10, 2000 (JP) ........................................ 2000-107758

(51) Int. Cl.⁷ .......................................... G06F 15/173
(52) U.S. Cl. ..................................... 709/238; 709/242
(58) Field of Search ................................ 709/238, 230, 709/235, 226, 242; 370/351, 352, 235, 409, 443

(56) References Cited

U.S. PATENT DOCUMENTS

| | | | |
|---|---|---|---|
| 6,148,000 A | * 11/2000 | Feldman et al. | 370/397 |
| 6,160,793 A | * 12/2000 | Ghani et al. | 370/236 |
| 6,286,052 B1 | * 9/2001 | McCloghrie et al. | 709/238 |
| 6,330,239 B1 | * 12/2001 | Suzuki | 370/395.1 |
| 6,452,915 B1 | * 9/2002 | Jorgensen | 370/338 |

FOREIGN PATENT DOCUMENTS

JP 06164631 A 6/1994

OTHER PUBLICATIONS

RFC 2205, Braden et al, "Resource ReSerVation Protocol (RSVP)", http://www.geckil.com/~harvest/rfc/rfc2205.txt, pp. 1–113, Sep. 1997.*

RFC 2474, Nichols et al, "Definition of Diifferentiated Services Field (DS Field) in the IPv4 and IPv6 Headers", http://www.geckil.com/~harvest/rfc/rfc2474.txt, pp. 1–18, Sep. 1998.*

RFC 2475, Blake et al, "An Architecture for Diifferentiated Services", http://www.geckil.com/~harvest/rfc/rfc2475.txt, pp. 1–36, Sep. 1998.*

* cited by examiner

Primary Examiner—Mehmet B. Geckil
(74) Attorney, Agent, or Firm—Katten Muchin Zavis Rosenman

(57) ABSTRACT

There are disclosed a network routing system and a routing apparatus. In a network having one routing apparatus to which one or more communication devices are connected, and another routing apparatus to which one or more communication devices are connected, a network routing system reserves a network resource using a service quality set-up protocol with bit sequence between these two routing apparatuses.

42 Claims, 17 Drawing Sheets

FIG. 3

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Version | | | | IHL | | | | Type of Service | | | | | | | | Total Length | | | | | | | | | | | | | | | |
| Identification | | | | | | | | | | | | | | | | Flags | | | Fragment Offset | | | | | | | | | | | | |
| Time to Live | | | | | | | | Protocol | | | | | | | | Header Checksum | | | | | | | | | | | | | | | |
| Source Address | | | | | | | | | | | | | | | | | | | | | | | | | | | | | | | |
| Destination Address | | | | | | | | | | | | | | | | | | | | | | | | | | | | | | | |
| Options | | | | | | | | | | | | | | | | | | | | | | | | Padding | | | | | | | |

FIG. 4

| 0 | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Version | | | | IHL | | | | Type of Service | | | | | | | | Total Length | | | | | | | | | | | | | | | |
| Identification | | | | | | | | | | | | | | | | Flags | | | Fragment Offset | | | | | | | | | | | | |
| Time to Live | | | | | | | | Protocol | | | | | | | | Header Checksum | | | | | | | | | | | | | | | |
| Source Address | | | | | | | | | | | | | | | | | | | | | | | | | | | | | | | |
| Destination Address | | | | | | | | | | | | | | | | | | | | | | | | | | | | | | | |
| Options | | | | | | | | | | | | | | | | | | | | | | | | Padding | | | | | | | |

FIG. 5

| Version | Traffic Class | Flow Label | | |
|---|---|---|---|---|
| Payload Length | | | Next Header | Hop Limit |
| Source Address | | | | |
| Destination Address | | | | |

FIG. 6

| Version | Traffic Class | Flow Label | | |
|---|---|---|---|---|
| Payload Length | | Next Header | Hop Limit | |
| Source Address | | | | |
| Destination Address | | | | |

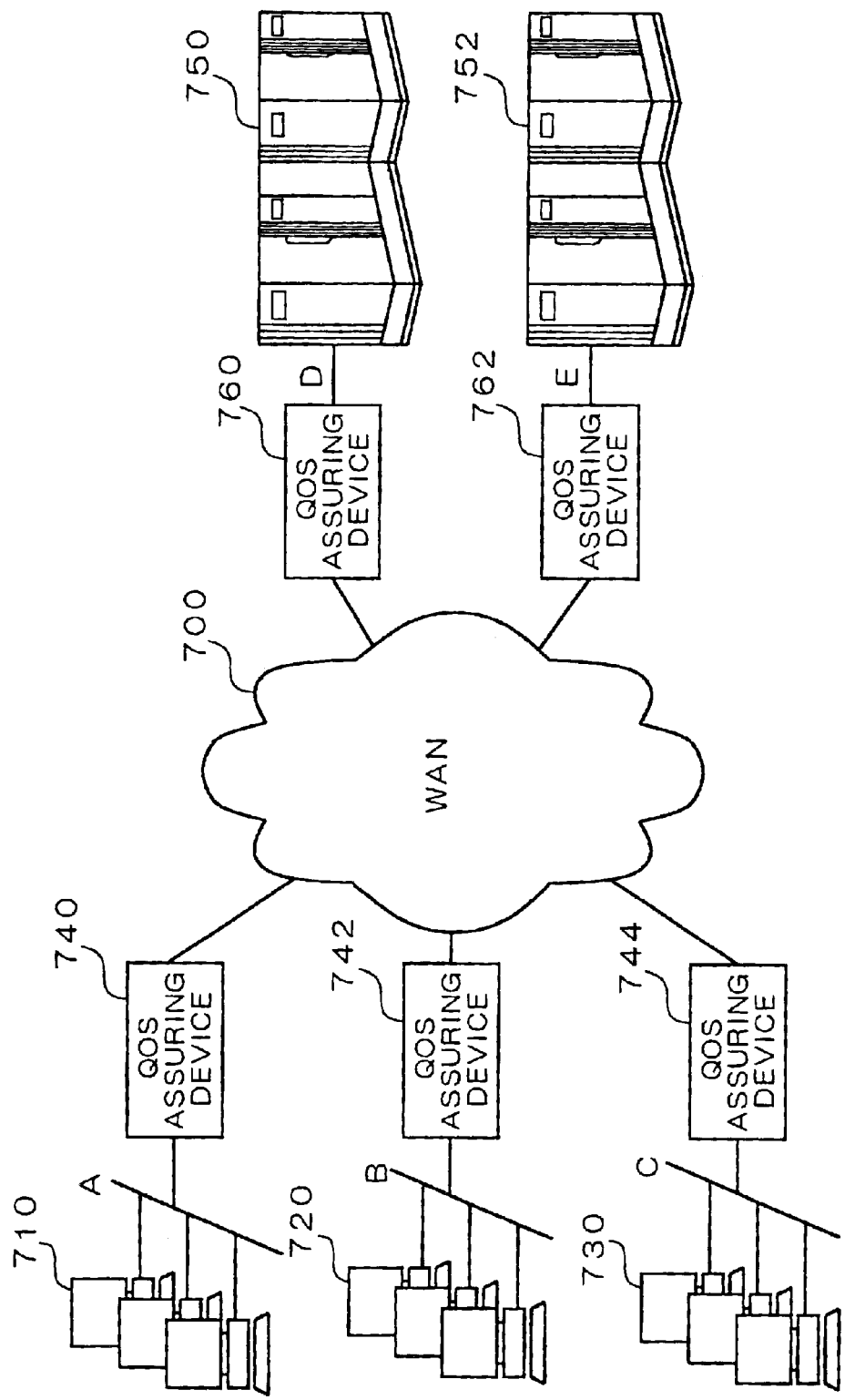

FIG. 13

| DESTINATION ADDRESS | CORRESPONDENT ADDRESS OF QOS ASSURING DEVICE |
|---|---|
| ADDRESS OF HOST COMPUTER 750 | ADDRESS OF QOS ASSURING DEVICE 760 |
| ADDRESS OF HOST COMPUTER 752 | ADDRESS OF QOS ASSURING DEVICE 762 |

FIG. 14

| DESTINATION ADDRESS | CORRESPONDENT ADDRESS OF QOS ASSURING DEVICE |
|---|---|
| ADDRESS OF ANY CLIENT TERMINAL CONNECTED TO SUB-NETWORK A | ADDRESS OF QOS ASSURING DEVICE 740 |
| ADDRESS OF ANY CLIENT TERMINAL CONNECTED TO SUB-NETWORK B | ADDRESS OF QOS ASSURING DEVICE 742 |
| ADDRESS OF ANY CLIENT TERMINAL CONNECTED TO SUB-NETWORK C | ADDRESS OF QOS ASSURING DEVICE 744 |

FIG. 15

| DESTINATION ADDRESS | CORRESPONDENT ADDRESS OF QOS ASSURING DEVICE | RESERVED BAND /BIT SEQUENCE |
|---|---|---|
| ADDRESS OF HOST COMPUTER 750 | ADDRESS OF QOS ASSURING DEVICE 760 | 300kbps/00000001 |
| ADDRESS OF HOST COMPUTER 752 | ADDRESS OF QOS ASSURING DEVICE 762 | 150kbps/00000010 |

FIG. 16

| DESTINATION ADDRESS | CORRESPONDENT ADDRESS OF QOS ASSURING DEVICE | RESERVED BAND /BIT SEQUENCE |
|---|---|---|
| ADDRESS OF ANY CLIENT TERMINAL CONNECTED TO SUB-NETWORK A | ADDRESS OF QOS ASSURING DEVICE 740 | 250kbps/00000001 |
| ADDRESS OF ANY CLIENT TERMINAL CONNECTED TO SUB-NETWORK B | ADDRESS OF QOS ASSURING DEVICE 742 | 150kbps/00000010 |
| ADDRESS OF ANY CLIENT TERMINAL CONNECTED TO SUB-NETWORK C | ADDRESS OF QOS ASSURING DEVICE 744 | 150kbps/00000011 |

*FIG. 18*

| 0 | 1 | 2 | 3 | 4 | 5 | 6 | 7 |
|---|---|---|---|---|---|---|---|
| DSCP | | | | | | CU | |

NETWORK ROUTING SYSTEM AND ROUTING APPARATUS

BACKGROUND OF THE INVENTION

The present invention relates to a network routing system and a routing apparatus for use with the network routing system, which can assure the quality of service in communicating a number of packets that satisfy the specified conditions.

In recent years, the rapid spread of personal computers or the Internet has been very striking, and an IP (Internet Protocol) network as the company network is also expanding now. Many carriers have started the IP services, and the network protocols tend to be unified into the IP.

For the applications, the electronic mail or WWW (World Wide Web) has come into wide use, or the multi-media data such as motion picture or sound has become popular. The IP has been mostly adopted as the protocol for use in the data communication.

Conventionally, there are two main ways of assuring the QoS (Quality of Service) in the IP network. One of them is employed for the distribution data of motion picture by the contents distribution server, for example, and is based on an RSVP (resource reservation protocol) as the QoS set-up protocol for assuring the QoS by reserving a network resource such as band for every specific flow (session) distinguished by the destination IP address, protocol ID, or destination port number. RSVP is a protocol as standardized by an organization of standardization IETF (Internet Engineering Task Force) for the Internet engineering. As one example, for the continuous stream data such as motion picture or sound, the RSVP is used to reserve a network resource such as transmission band on the transmission path from the transmitting server to the receiving client, and the delay or jitter is suppressed within a certain limit to enable reproduction of smooth sound or motion picture without depending on the conditions of traffic load on the transmission path, so that a required QoS can be realized. Lately, the network equipment with RSVP mounted or the multi-media applications coping with the RSVP have been put on the market, and an OS (Operating System) for the PC (Personal Computer) is configured to cope with the RSVP.

The other way of assuring the QoS is using a TOS (Type Of Service) field contained in an IPv4 header, in which the transfer processing in the network equipment is changed for each value of the TOS field to realize the quality of service differentiated for the packet transfer. The TOS field is provided within the IP header. There might be some provisions, for example, such as to transmit or transfer the packets of routing information prior to other information, but they have hardly spread, and the TOS field has been differently interpreted for each vendor. To redefine this, Diffserv (Differentiated Service) has appeared on the market. This redefines the previous usage of the TOS field contained in the IP header, in which the packet transfer is differentiated by changing the rate of abolition within the network equipment for each value set in the TOS field. For instance, ISP (Internet Service Provider) may provide in accordance with the contract with the user, a secure packet transfer service with high QoS to the user of high charge, or provides a packet transfer service of best effort to the contract user of regular charge.

Besides the IP packet transfer as the multi-media data or ISP service, some data communications are needed to assure the high QoS including a small delay. For instance, in the company network, the data communication of basic business activities including the order entry or accounting is highly important for the company, and is required to have high quality of transmission with small delay. Such communication is required to have architecture for transmitting the data with small delay and low loss at any time through a unit for assuring the band without regard to the network condition of traffic load between the client terminal and the host computer. Further, from the viewpoint of reduced network management costs, these basic business activities are shifting from the conventional SNA (System Network Architecture) or FNA (Fujitsu Network Architecture) to the IP identical to other information communication protocols for the electronic mail or WWW.

However, from the stand point of reduced network management costs, there is a strong demand for integrating the information communication such as WWW or the electronic mail and the basic service communication based on the IP, but in particular, the WAN (Wide Area Network) having slow transmission rate is subjected to other traffic loads of information communication, so that the excellent response of the basic service data communication is impeded. Therefore, in the current state, a private line is laid separately from the information communication to assure the quality of transmission in the basic service data communication in respect of small delay and so on.

By the way, using the RSVP as described above, the band can be reserved expressly, but is intended for a specific flow, or the special application data which the user terminal transmits to the specified destination address. The RSVP is mainly applied to the multi-media data that occur successively and have certain traffic characteristic. Accordingly, the RSVP is not suitable for the order entry or accounting activities which take place at a number of terminals sporadically located at various sites. Generally, the RSVP needs to have a process for discriminating the flow based on the IP address, protocol ID, or port number, which may impose great processing loads on the network equipment. Also, it is usually necessary to transmit or receive a signaling of the RSVP between the end systems for communication. In the cases where the RSVP was not supported by the end system, there was no method of reserving the resource such as the band of network in dynamical and explicit manner.

Also, using the Diffserv or TOS, the preferential transfer service can be implemented by the transfer processing method with the network equipment for a group of packets having the same value of DSCP (Differentiated Service Codepoint or of TOS field, but not limited in a specific flow. Unlike the RSVP, the Diffserv or TOS effects no signaling, and there is no architecture for reserving a network resource such as band on the network path and allocating the network resource to transfer the group of packets, so that the quantitative services cannot be provided. Accordingly, in the current state, there is no architecture for allocating explicitly the network resource such as band to a group of packets transmitted from a number of clients or applications located randomly to provide the services with the high QoS.

For example, it is common that the service communication in the company network is performed between a few mainframe host computers (Servers) and a total of several hundreds to several thousands of client terminals. Though there is the need of assuring the QoS for the service communication that is the most important for the company, differently from the WWW traffic, electronic mail, or FTP (File Transfer Protocol) traffic, it is practically impossible to install various programs required to implement the RSVP or Diffserv in a total of several thousands of client terminals, or replace the terminals, and it was almost difficult to assure the QoS.

Further, in the Internet, the user makes dial-up connection to the ISP from the residence to receive variety kinds of services, but if the high QoS service is provided to the user, the user terminal or application is necessary to cope with the RSVP or Diffserv. In order to provide or accept the fair service, there is the need of having architecture for providing the service of high QoS not only on the user side but also on the ISP side. In this way, the architecture for assuring the high QoS is required over the entire network including the individual user terminals, but no architecture has been prepared in the state of the art.

SUMMARY OF THE INVENTION

The present invention has been achieved in the light of the above-mentioned problems, and its objective is to provide a network routing system and a routing apparatus which is readily capable of assuring the quality of service in the communication employing a number of terminals.

A network routing system of the invention in a network having a first routing apparatus to which one or more first communication devices are connected, and a second routing apparatus to which one or more second communication devices are connected, reserves a network resource in accordance with a service quality set-up protocol between the first routing apparatus and the second routing apparatus. Since the network resource is reserved between the first routing apparatus and the second routing apparatus, the reserved network resource can be utilized in the communication between one or more first communication devices connected to the first routing apparatus and one or more second communication devices connected to the second routing apparatus. Therefore, the quality of service in the communication using a number of communication devices can be readily assured.

The first routing apparatus preferably comprises a first service quality set-up processing unit for reserving a network resource using a service quality set-up protocol, first packet classification processing unit for classifying a specific packet that is to be transmitted using the reserved network resource from among the data packets transmitted from the first communication device, bit sequence setting unit for setting a predetermined bit sequence to the specific packet classified by the packet classification processing unit, and first transfer processing unit for transferring the specific packet having the bit sequence set by the bit sequence setting unit to the second routing apparatus, using the network resource corresponding to the content of the bit sequence contained in the specific packet.

The network resource is reserved using the service quality set-up protocol, and the specific packet to be assured of the quality of service is classified from among the data packets transmitted from one or more first communication devices, and the particular bit sequence is set in the specific packet classified. The communication is effected using the reserved network resource. Therefore, the specific packet to be transmitted from the first routing apparatus can be surely assured to the quality of service.

The second routing apparatus preferably comprises second service quality set-up processing unit for reserving a network resource using a service quality set-up protocol, second packet classification processing unit for classifying the specific packet having appended the bit sequence indicating transmission using the reserved network resource from among the data packets to be input, bit sequence deleting unit for deleting the bit sequence contained in the specific packet classified by the packet classification processing unit, and second transfer processing unit for transferring the data packet having the bit sequence deleted by the bit sequence deleting unit to the second communication device.

The network resource is reserved using the service quality set-up protocol, and the specific packet to be transmitted from the first routing apparatus is classified using this reserved network resource, and the bit sequence contained in the specific packet is deleted. Then the specific packet is transmitted to the second communication device. Therefore, the quality of service can be certainly assured for the specific packet to be received by the second routing apparatus.

It is preferable to provide a third routing apparatus between the first and second routing apparatuses for routing the transmission of data packets between them. This third routing apparatus comprises third service quality set-up processing unit for reserving a network resource using a service quality set-up protocol, third packet classification processing unit for classifying the specific packet having appended the bit sequence indicating the transmission using the reserved network resource from among the input data packets, and third transfer processing unit for transferring the specific packet classified by the third packet classification processing unit to the second routing apparatus, using the network resource corresponding to the content of the bit sequence contained in the specific packet.

The network resource is reserved using the service quality set-up protocol, and the specific packet transmitted from the first routing apparatus is classified using this reserved network resource and transferred to the source routing apparatus. Therefore, the quality of service can be certainly assured for the specific packet to be routed by the third routing apparatus.

The service quality set-up protocol is preferably a resource reservation protocol. The communication band required to assure the quality of service can be secured using the resource reservation protocol.

The first service quality set-up processing unit preferably transmits a service quality set-up protocol message having the bit sequence contained in an unused reserve area to the second routing apparatus to associate the traffic condition of the network resource reserved using the service quality set-up protocol with the bit sequence. Since the bit sequence necessary to classify the specific packet to be assured of the quality of service can be notified by transmitting the service quality set-up protocol message, the second or third routing apparatus can securely classify the specific packet to be assured of the quality of service by using the bit sequence contained in this service quality set-up protocol message.

The first service quality set-up processing unit preferably transmits a service quality set-up protocol message having appended the bit sequence to the second routing apparatus to associate the traffic condition of the network resource reserved using the service quality set-up protocol with the bit sequence. The bit sequence for use with the classification of the specific packet can be notified, upon transmitting the service quality set-up protocol message, by providing an additional field for appending a new bit sequence in this service quality set-up protocol message, besides having this bit sequence contained in the unused reserve area of the message. The second or third routing apparatus can securely classify the specific packet to be assured of the quality of service be reading the bit sequence within the additional field.

The second service quality set-up processing unit checks to see whether or not the bit sequence is contained at a predetermined location of the service quality set-up protocol message to be transmitted from the first routing apparatus. If the bit sequence is not contained, the second routing apparatus preferably performs the operation in accordance with a normal service quality set-up protocol. Also, the third service quality set-up processing unit checks to see whether or not the bit sequence is contained at a predetermined location of the service quality set-up protocol message transmitted from the first routing apparatus. If the bit sequence is not contained, the third routing apparatus preferably performs the operation in accordance with a normal service quality set-up protocol.

If the bit sequence for use to classify the specific packet is not contained in the service quality set-up protocol message, the operation is performed in accordance with the normal service quality set-up protocol as conventionally performed. Therefore, the reserving operation of the network resource in the network routing system of the invention can be accomplished without having effect on the conventional reserving operation of the network resource.

In the case where the specific packet is an IP packet in accordance with the Internet protocol version 4, it is preferred that the bit sequence is contained in the type of service field that is found in the header part of this IP packet. In the case where the specific packet is an IP packet in accordance with the Internet protocol version 6, it is preferred that the bit sequence is contained in the traffic class field that is found in the header part of this IP packet. Also in the case where the specific packet is an IP packet, it is preferred that the bit sequence may be appended in the header part of this IP packet.

Since the bit sequence is set in the type of service field or traffic class field which is not of great importance in the transmission or reception of the IP packet, the specific packet can be transmitted to the second or third routing apparatus without change in the format of the IP packet. In the case where the bit sequence is appended to the header part, it is especially beneficial to contain various kinds of information in this bit sequence, because the bit sequence can be easily extended to a greater number of bits.

The bit sequence setting unit preferably sets a random value to the bit sequence. Also, the bit sequence setting unit preferably sets a value of the bit sequence in ascending order or descending order.

In the case where the bit sequence has the random value set, a plurality of bit sequences having greatly different values can be easily produced. Also, in the case where the bit sequence has the value in ascending order or descending order, a plurality of bit sequences having different values can be produced by simple arithmetic operation.

The bit sequence setting unit preferably sets a preset value to the bit sequence in correspondence to the IP address of the second routing apparatus. The bit sequence setting unit preferably sets the preset value to the bit sequence in correspondence to the communication band of the network resource reserved by the first service quality set-up processing unit.

The operation of generating a new bit sequence can be reduced by preparing the value of the bit sequence in correspondence to the destination address of transmitting the specific packet or the communication band to be reserved.

The first packet classification processing unit preferably classifies the specific packet based on the destination address of the data packet transmitted from the first communication device. Also, the first packet classification processing unit preferably classifies the specific packet based on the destination network address of the data packet transmitted from the first communication device. In the case where there are a small number of second communication devices to which the specific packet is transmitted, or where the data packets transmitted to the second communication devices connected to the designated network are only assured of the quality of service, the classification process can be quite relieved of the load, because there are reduced number of destination addresses or destination network addresses to be comparable in making the classification.

The first packet classification processing unit preferably classifies the specific packet based on the transmission source address of the data packet transmitted from the first communication device. Also, the first packet classification processing unit preferably classifies the specific packet based on the transmission source network address on the data packet transmitted from the first communication device. In the case where there are a small number of first communication devices that transmit the specific packet, or where the data packets transmitted from the first communication devices connected to the designated network are only assured of the quality of service, the classification process can be relieved of the load, because there are reduced number of transmission source addresses or transmission source network addresses to be comparable in making the classification.

The first packet classification processing unit preferably classifies the specific packet based on the destination port number of the data packet transmitted from the first communication device. In the case where the data packets are assured of the quality of service only when a particular application is communicated between the first communication device and the second communication device, the specific packet can be classified more efficiently using a designated destination port number set in correspondence to this particular application.

The first packet classification processing unit preferably classifies the specific packet based on the protocol number of the data packet transmitted from the first communication device. In the case where the protocol for communication of a particular application is uniquely determined and the data packets transmitted or received using this protocol are assured of the quality of service, the specific packet can be classified more efficiently, using a protocol number for use with this particular application.

The first packet classification processing unit preferably classifies the specific packet based on the reception interface of the data packet transmitted from the first communication device. In the case where a plurality of first communication devices are subdivided into two or more sub-networks, and the reception interface is different for each sub-network, when the data packets transmitted from the first communication devices connected to a designated sub-network are assured of the quality of service, the specific packet can be classified only be designating the reception interface through which the data packets are input, without examining the data within the data packets, whereby the processing load of classifying the specific packet can be greatly reduced.

In the case where there are a plurality of second routing apparatuses that are transmission destination of the specific packet, the first routing apparatus has a conditional database containing information of combining the addresses of the plurality of second routing apparatuses and the destination addresses of the specific packet. The first service quality set-up processing unit preferably retrieves the conditional database, based on an address of the specific packet transmitted from the first communication device, to designate the second routing apparatus that exists in front of the network connecting the communication devices that is destined for transmission of the specific packet, and transmits a service assurance set-up protocol message to the second routing apparatus designated.

In the case where there are a plurality of second routing apparatuses that are transmission destination of the specific packet, the first routing apparatus has a conditional database containing information of combining the addresses of the plurality of second routing apparatuses and the addresses of destination network connected to the second routing apparatuses. The first service quality set-up processing unit preferably retrieves the conditional database, based on a destination network address of the specific packet transmitted from the first communication device, to designate the second routing apparatus that exists in front of the network connecting the communication devices that is destined for transmission of the specific packet, and transmits a service assurance set-up protocol message to the second routing apparatus designated.

In the case where there are a plurality of second routing apparatuses that are transmission destination of the specific packet, the first routing apparatus has a conditional database containing information of combining the addresses of the plurality of second routing apparatuses and the destination port numbers of the specific packet. The first service quality set-up processing unit preferably retrieves the conditional database, based on a destination port number of the specific packet transmitted from the first communication device, to designate the second routing apparatus that exists in front of the network connecting the network communication devices that is destined for transmission of the specific packet, and transmits a service assurance set-up protocol message to the second routing apparatus designated.

In the case where the data packets with assurance of the quality of service are transmitted to the second communication devices sporadically located at various sites, a plurality of second routing apparatuses to which the separate second communication devices are connected are required. In this case, if the conditional database contains information of combining the destination addresses of the specific packet and the destination network addresses, or the destination port numbers for the particular application, and the addresses of the second routing apparatuses, the second routing apparatus that is intended to reserve the network resource can be readily designated, upon the input of a certain specific packet.

Preferably, the first routing apparatus has monitoring unit for monitoring the data rate of the specific packet, and the first service quality set-up processing unit changes the reservation content of the network resource, when a variation in data rate is detected by the monitoring operation of the monitoring unit. In the network routing system of this invention, since the data rate of the specific packet to be input from a plurality of first communication devices may change, the reservation content of the network resource is corrected in accordance with the changed data rate while monitoring the variable data rate, whereby the specific packet having variable data rate can be assured of the quality of service.

The first service quality set-up processing unit preferably starts the reserving operation for the network resource, when the specific packet is first detected. Since the network resource is not reserved before the specific packet is first detected, the network resource can be effectively utilized.

Preferably, the first routing apparatus has a timer for clocking a predetermined time, and the first service quality set-up processing unit initiates the timer when the last specific packet is detected, and tears down the reservation of the network resource if a predetermined time has elapsed before the next specific packet is detected. If the transmission of the specific packet does not occur for a predetermined time, the reserved network resource is released to enable the network resource to be effectively utilized.

Preferably, the first routing network has a schedule timer for clocking a predetermined length of time, and the first service quality set-up processing unit reserves the network resource within the predetermined time. In the case where the time zone for transmitting the specific packet is predetermined, the schedule timer is set in accordance with this time zone, whereby the network resource is transmitting or receiving the specific packet can be surely reserved to assure the quality of service.

The second service quality set-up processing unit preferably transmits a second service quality set-up protocol message to the first routing apparatus to reserve the network resource corresponding to the transmission path from the second routing apparatus to the first routing apparatus, upon receiving a first service quality set-up protocol message for starting the reserving operation of the network resource from the first routing apparatus. When the service quality set-up protocol message is transmitted from the first routing apparatus to the second routing apparatus, the service quality set-up protocol message is transmitted back from the second routing apparatus to the first routing apparatus, whereby the network resource corresponding to the bi-directional communications channel using the first and second routing apparatuses can be reserved, and the quality of service can be surely assured for the communication with the network resource.

The second service quality set-up processing unit preferably transmits a second service quality set-up protocol message to the first routing apparatus in the case where the transmission source address of the first service quality set-up protocol message that has been received corresponds to the first routing apparatus.

The second service quality set-up processing unit preferably transmits a second service quality set-up protocol message to the first routing apparatus in the case where the first service quality set-up protocol message that has been received includes the same data as the bit sequence contained in the specific packet.

It is possible to determine whether or not a message generated by the first routing apparatus has been received by depending on the presence or absence of a transmission source address or a particular bit sequence contained in the message. And when the message generated by the first routing apparatus is received, a second service quality set-up protocol message is transmitted and a network resource is reserved on the bi-directional communications channel, whereby the quality of service can be securely assured for a variety of kinds of data packets transmitted or received on the bi-directional communications channel in connection with the specific packet.

A routing apparatus of the invention comprises service quality set-up processing unit for reserving a network resource in accordance with a service quality set-up protocol, packet classification processing unit for classifying the specific packet that is to be transmitted using the reserved network resource from among the data packets transmitted from one or more communication devices, bit sequence setting unit for getting a particular bit sequence to the specific packet classified by the packet classification processing unit, and transfer processing unit for transferring the specific packet having the bit sequence set by the bit sequence setting unit using the network resource corresponding to the content of the bit sequence contained in the specific packet.

The network resource is reserved using the service quality set-up protocol, the specific packet to be assured of the quality of service is classified from among the data packets transmitted from one or more communication devices, and the particular bit sequence is set to the specific packet classified, whereby the communication is made using the reserved network resource. Therefore, the quality of service can be securely assured for the specific packet transmitted from the routing apparatus of the invention.

The routing apparatus of the invention preferably further comprises bit sequence deleting unit for deleting the bit sequence contained in the received specific packet when the specific packet containing the bit sequence is received, and the specific packet having the bit sequence deleted is transmitted to the communication device by the transfer processing unit. Since in the invention the bit sequence has been set to classify the specific packet, it is possible to prevent malfunction from being caused by this bit sequence in various communication devices at later stage, if this bit sequence is deleted when the specific packet is received.

BRIEF DESCRIPTION OF THE DRAWINGS

FIG. 3 is a diagram showing the contents of an IP header corresponding to IPv4;

FIG. 4 is an explanatory diagram for appending a specific bit sequence to the IP header of IPv4;

FIG. 5 is a diagram showing the contents of an IP header corresponding to IPv6;

FIG. 6 is an explanatory diagram for appending a specific bit sequence to the IP header of IPv6;

FIG. 12 is a schematic view illustrating another configuration of a company network;

FIG. 13 is a diagram showing the contents of a conditional database contained in the QoS assuring device to which a client terminal is connected;

FIG. 14 is a diagram showing the contents of a conditional database contained in the QoS assuring device to which a host computer is connected;

FIG. 15 is a diagram showing the contents of a conditional data in which the initial value of reservation band and the value of bit sequence are provided;

FIG. 16 is a diagram showing the contents of a conditional database in which the initial value of reservation band and the value of bit sequence are provided;

FIG. 18 is a chart showing the format of a DS field.

DESCRIPTION OF THE PREFERRED EMBODIMENT

A network routing system according to one embodiment of the present invention will be described below with reference to the drawings.

Figure 1:
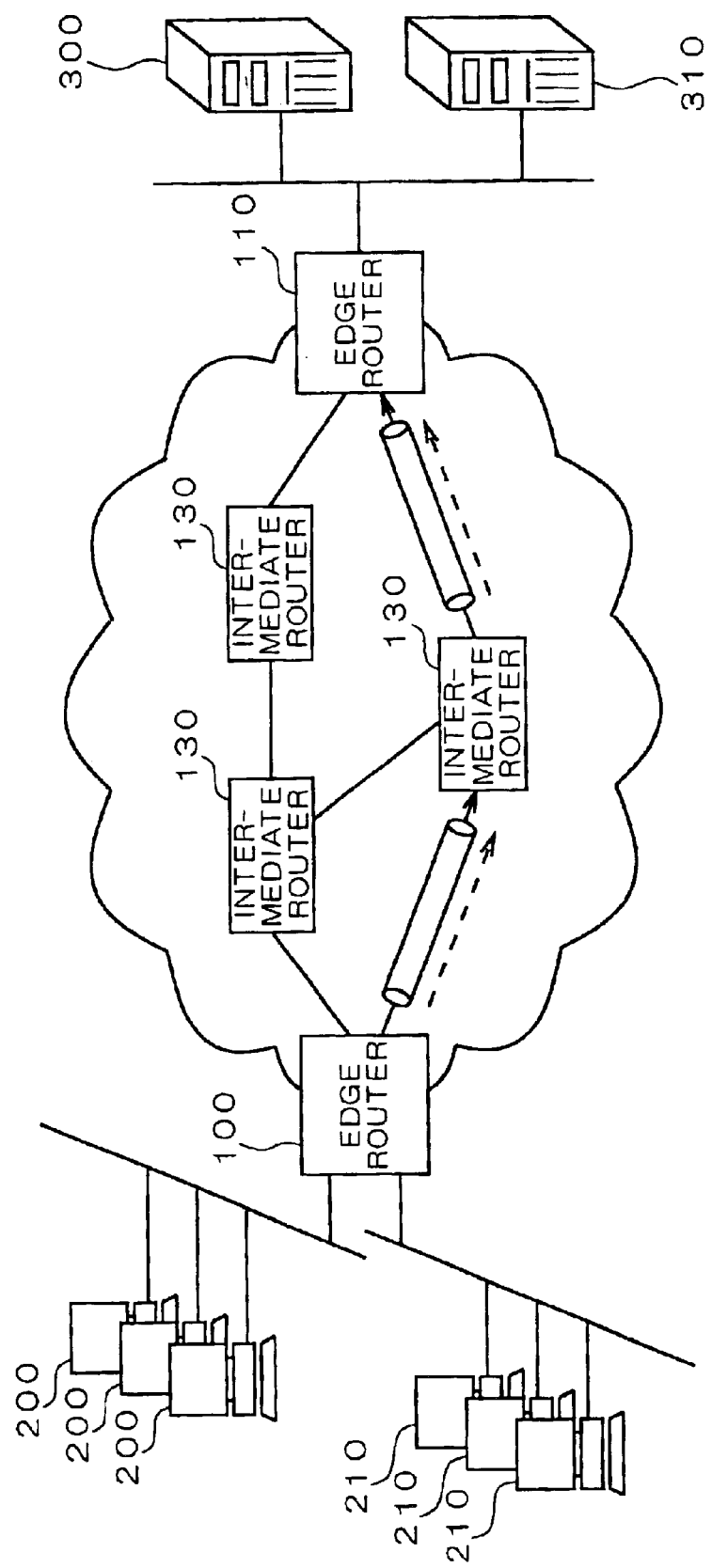
FIG. 1 is a block diagram of the principle of a network routing system according to the present invention.

FIG. 1 is a block diagram of the principle of the network routing system according to one embodiment of the invention. The network routing system as shown in FIG. 1 comprises an edge router 100 as the first routing apparatus that is connected to a plurality of client terminals 200, 210 as the first communication device, an edge router 110 as the second routing apparatus that is connected to a plurality of servers 300, 310 as the second communication device, and a plurality of intermediate routers 130 as the third routing apparatus for interconnecting these two edge routers 100, 110.

First embodiment

A network for use with the first embodiment of the invention is supposed to be a router network as shown in FIG. 1. This router network is an IP network which uses the IP packet as the data packet, wherein the TCP/IP protocol is used for the communication of various kinds of data. In FIG. 1, each of a plurality of client terminals 200 is a communication device for transmitting the data packet subject to QoS assurance. Also, each of a plurality of client terminals 210 is a communication device for transmitting the data packet not subject to QoS assurance. One server 300 is communicated with the client terminals 200, and receives the data packet subject to QoS assurance from the client terminals 200. The other server 310 is communicated with the client terminals 210, and receives the data packet not subject to QoS assurance from the client terminals 210. In this embodiment, the data packet subject to QoS assurance is transmitted by each of the plurality of client terminals 200, and then received by the server 300, whereby a company network is configured for making data communications regarding the basic business activities including the order entry or accounting that can directly contribute to the profits of the company.

In FIG. 1, an IP packet subject to QoS assurance is sent out from any of the client terminals 200, and this IP packet is transmitted via an edge router 100, an intermediate router 130, and an edge router 110 to a server 300.

Figure 2:
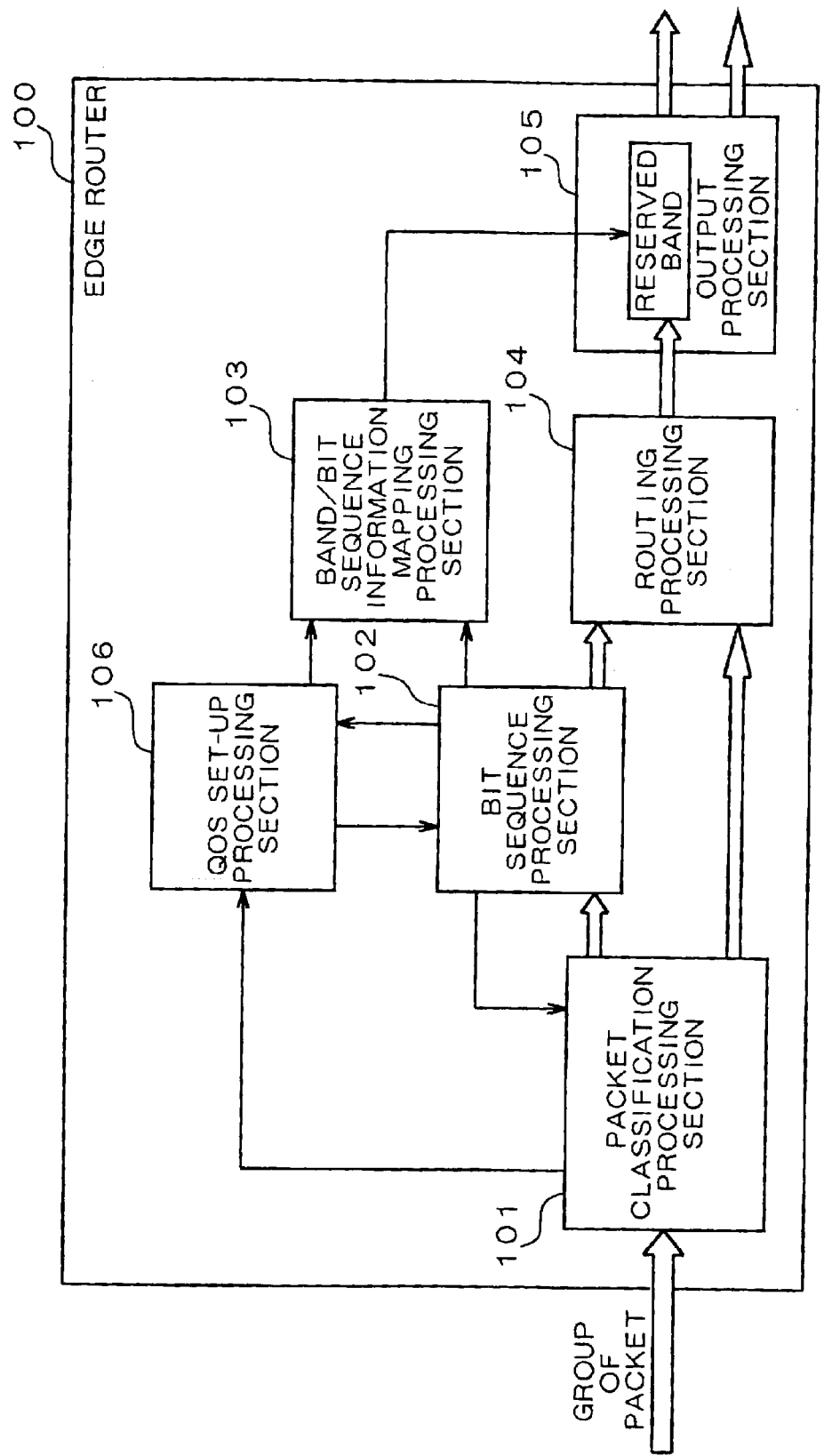
FIG. 2 is a schematic diagram showing the configuration of an edge router according to a first embodiment of the invention.

FIG. 2 is a schematic diagram showing the configuration of the edge router 100. The other edge router 110 and the intermediate router 130 have fundamentally the same configuration.

As shown in FIG. 2, the edge router 100 comprises a packet classification processing section 101, a bit sequence processing section 102, a band/bit sequence information mapping processing section 103, a routing processing section 104, an output processing section 105, and a QoS set-up processing section 106.

The packet classification processing section 101 corresponds to packet classification processing unit; the bit sequence processing section 102 corresponds to bit sequence setting unit and bit sequence deleting unit; the routing processing section 104 and the output processing section 105 correspond to transfer processing unit; and the QoS set-up processing section 106 corresponds to service quality set-up processing unit.

The packet classification processing section 101 classifies the IP packets subject to QoS assurance from among the group of packets to be input. More specifically, there are two sorts of IP packets that are subject to QoS assurance. One of them is an IP packet (referred to as a "first IP packet") transmitted from the client terminal 200, and the other is an IP packet (referred to as a "second IP packet") transmitted from the other edge router 110 using a reserved communication band. The packet classification processing section 101 classifies IP packets into those two sorts of IP packets that are subject to QoS assurance and those that are not. Thereafter, the first IP packet and the second IP packet subject to QoS assurance are collectively called a "specific IP packet".

The bit sequence processing section 102 performs a process of inserting or appending a predetermined bit sequence into or to the specific IP packets classified by the packet classification processing section 101, and a process of deleting this bit sequence.

More specifically, for the first IP packet sent out from the client terminal 200, the bit sequence processing section 102 performs a process of inserting a particular bit sequence into a predefined region in the header part (IP header) of the IP packet, or a process of appending a particular bit sequence to the header part. Also, for the second IP packet sent out from the intermediate router 130, the bit sequence processing section 102 performs a process of deleting the particular bit sequence inserted or appended into or to the header part of the IP packet. In this manner, the particular bit sequence inserted into or appended to the IP header by one edge router 100 is deleted before the IP packet is transmitted from the other edge router 110 to the server 300. The same processing applies for the IP packet transmitted via the opposite path, and the particular bit sequence inserted into or appended to the IP header by the other edge router 110 is deleted before the IP packet is transmitted from one edge router 100 to the client terminal 200.

FIG. 3 is a diagram showing the contents of an IP header corresponding to IPv4 (version 4). The contents of the IP header are defined in RFC791 as the RFC (Request for Comments) document. As shown in FIG. 3, the IP header corresponding to IPv4 consists of the Version, IHL (Internet Header Length), Type of Service, Total Length, Identification, Flags, Fragment Offset, Time to Live, Protocol, Header Checksum, Source Address, Destination Address, Options, and Padding. As one example, a particular bit sequence is set in the type of service field.

This particular bit sequence is used to identify the IP packet with a band reserved by the RSVP. Accordingly, it is necessary that this bit sequence value set for the IP packets that are communicated in the specific band may be different from the content of the type of service field for other IP packets.

FIG. 4 is an explanatory diagram for appending a particular bit sequence to the IP header of IPv4. As described above, the particular bit sequence is set in the type of service field within the IP packet, but a new field next to the IP header may be additionally provided to set the particular bit sequence in this field, as shown in FIG. 4. In FIG. 4, the new field as long as four octets is reserved for the particular bit sequence, but this length is variable, and may be one octet or greater than four octets.

FIG. 5 is a diagram showing the contents of an IP header corresponding to IPv6 (version 6). The content of the IP header is defined in RFC2460 as the RFC document. As shown in FIG. 5, the IP header corresponding to IPv6 consists of the Version, Traffic Class, Flow Label, Payload Length, Next Header, Hop Limit, Source Address, and Destination Address. As one example, a particular bit sequence is set in the traffic class field.

FIG. 6 is an explanatory diagram for appending a particular bit sequence to the IP header corresponding to IPv6. As described above, the particular bit sequence is set in the traffic class field within the IP header, but a new field next to the IP header may be additionally provided to set the particular bit sequence in this field, as shown in FIG. 6.

The band/bit sequence information mapping processing section 103 as shown in FIG. 2 performs a process of coordinating the particular bit sequence set by the bit sequence processing section 102 with the communication band reserved by sending or receiving the RSVP message. In particular, since it is unknown to one edge router 100 how the content of the particular bit sequence that has been set by the bit sequence processing section 102 within the other edge router 110 corresponds to the reserved communication band, the band/bit sequence information mapping processing section 103 is used to effect mapping between them.

For example, in a case where the communication band is reserved using the RSVP, a path message is sent from one edge router 100 to the other edge router 110, and the particular bit sequence is inserted into a predetermined area of this path message, or the particular bit sequence is appended to the path message. The band/bit sequence information mapping processing section 103 within the other edge router 110 that has received this path message analyzes this path message, and extracts the particular bit sequence, so that the value of the particular bit sequence set by one edge router 100 can be known.

Figure 7:
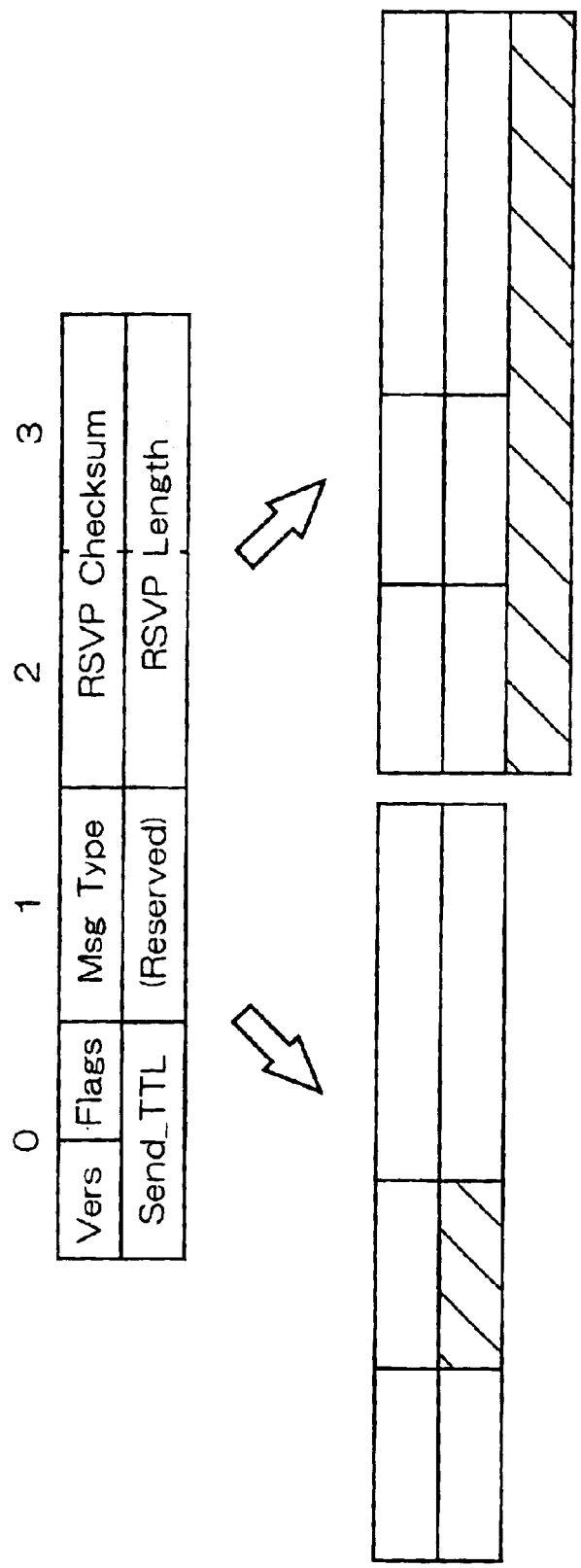
FIG. 7 is an explanatory diagram for a specific bit sequence to be set in a message of RSVP.

FIG. 7 is an explanatory diagram for a particular bit sequence that is set in an RSVP message. The RSVP common header format is defined in RFC2205 as the RFC document. As shown in FIG. 7, an RSVP common header consists of the version (Vers), Flags, message type (Msg Type), RSVP Checksum, send time to live (Send TTL), Reserved, and RSVP Length. As one example, a particular bit sequence is set in the reserved field. As another example, the particular bit sequence may be set in the form appendant to the RSVP message.

A message type field contained in the format of an RSVP common message is used to indicate the message type that is represented by a Path message, a reservation (Resv) message, a reservation cancellation (Resv Tear) message and a path cancellation (Path Tear) message.

The routing processing section 104 performs a routing process of routing the next device (e.g., intermediate router 130) for transmitting the IP packet based on a destination address contained in the IP header. This process is performed irrespective of the specific IP packet.

The output processing section 105 has a plurality of buffer memories for sending successively the input IP packets to the transmission path to which the destined device is connected. For example, a communication band is reserved by the RSVP using a specific buffer memory. The IP packet written into this buffer memory is read out from this buffer memory at a necessary timing to secure the reserved communication band, and sent out to the communications channel. The QoS set-up processing section 106 performs a process of reserving or tearing the communication band by generating and transmitting or receiving a variety of kinds of messages for RSVP.

Figure 8:
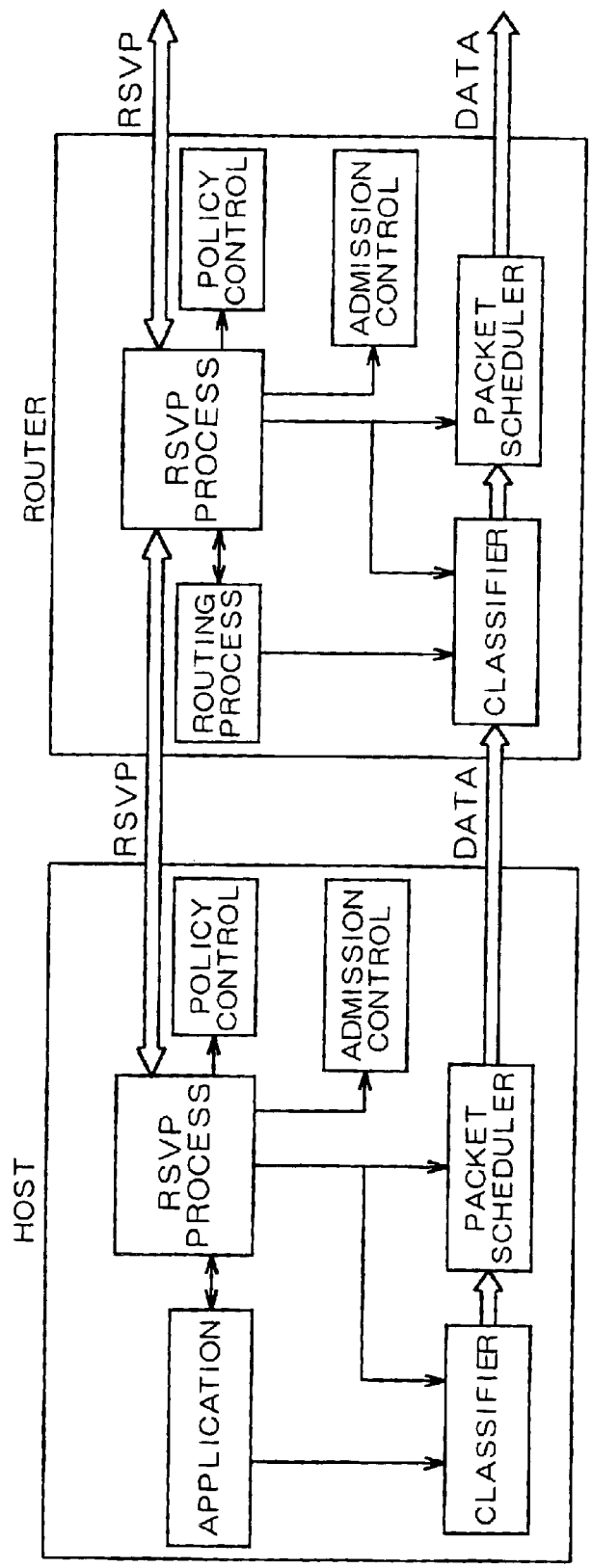
FIG. 8 is a conceptual diagram illustrating an installed state of RSVP in any of various kinds of communication apparatus such as a router.

FIG. 8 is a conceptual diagram showing a state where the RSVP is mounted in various kinds of communication devices such as a router. The configuration of FIG. 8 is defined in RFC2205 as the RFC document. As shown in FIG. 8, in a case where the communication band is reserved using the RSVP, it is required to have the processes of Classifier, Routing Process, RSVP Process, Packet Scheduler, Policy Control, and Admission Control.

Classifier is a process for classifying the input packets, and is performed by the packet classification processing section 101 in the edge router 100. Routing Process is a process for setting up the destination address of IP packet, and is performed by the routing processing section 104 in the edge router 100. RSVP process is a process for generating or transferring various kinds of RSVP message, as well as reserving or tearing the network resources based on the content of each message, and is performed by the QoS set-up processing section 106 in the edge router 100. Policy Control is a process for setting up the upper limit of the communication band that can be reserved by one message, or setting the reservation for the designated user (communication device), and is performed by the QoS set-up processing section 106 in the edge router 100. Admission Control is a process for deciding whether or not to accept a new band reservation based on the communication band being used, and is performed by the QoS set-up processing section 106 in the edge router 100. For example, in a case where almost the communication band is already in use, Admission Process rejects to accept the reservation, because it is difficult to secure the communication band corresponding to a new reservation. Packet Scheduler is a process for setting the timing of sending the IP packet in accordance with the reserved communication band, and is performed by the output processing section 105 in the edge router 100.

Since with the conventional RSVP the reservation of network resources is made in accordance with the flow between the end users (e.g., between the server 300 and the client terminal 210), the RSVP process corresponding to the edge router 100 includes an operation of transferring the path message or reservation message. However, in this embodiment, the edge router 100 performs the operation of generating a new path message or reservation message, when a specific packet is entered. The edge router 100 performs the operation of passing a path message or a reservation message to the intermediate router 130 at the next stage, like the normal router as conventionally utilized, when the path message or reservation message is sent from the client terminal 210.

Accordingly, one edge router 100 is required to discriminate whether a path message or a reservation message is generated and sent from the edge router 110 or the server 310 and the like, when the path message or the reservation message is sent from the other edge router 110. This discrimination can be easily effected by checking whether or not a particular bit sequence is set in a predetermined area of the RSVP message.

Figure 9:
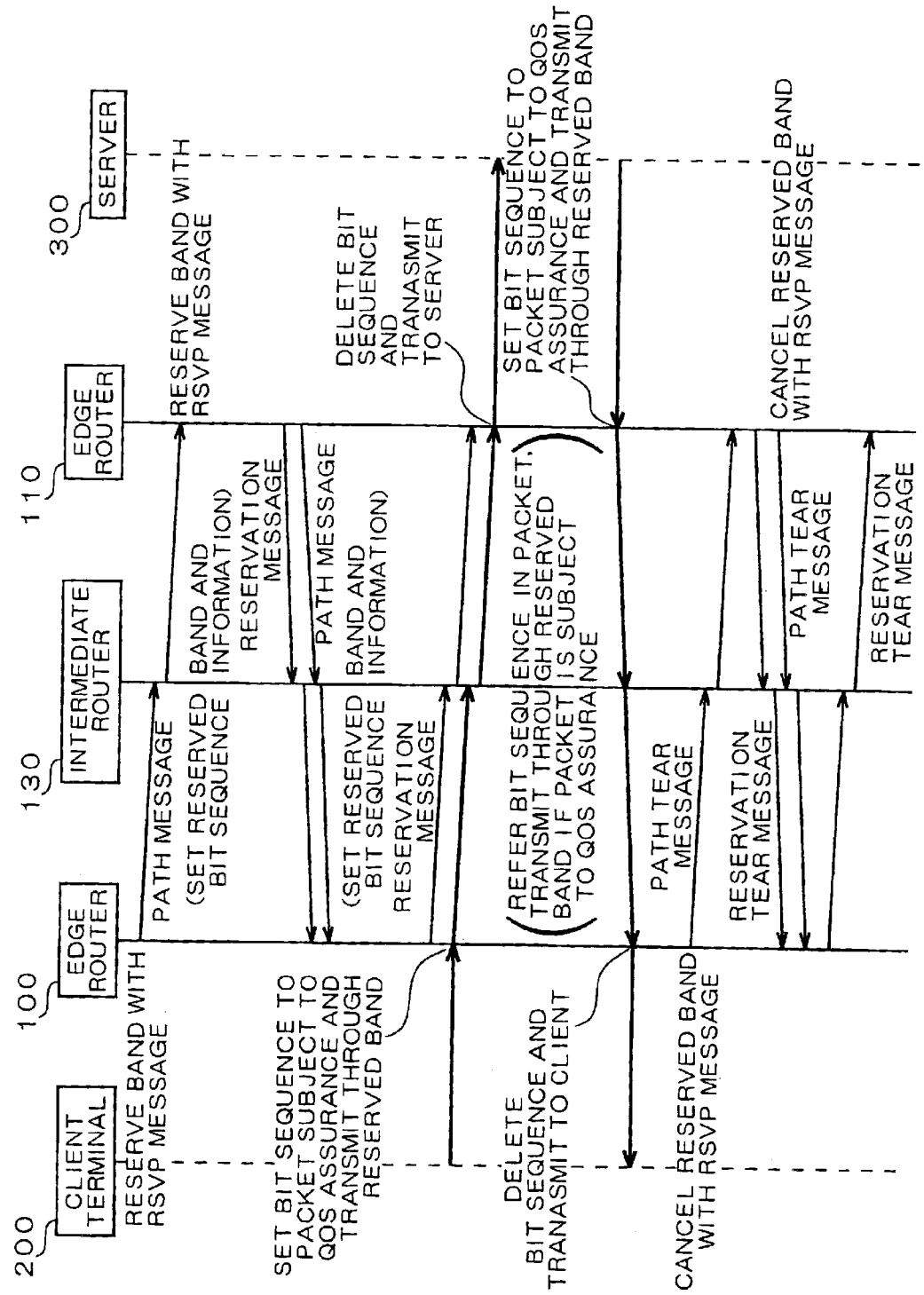
FIG. 9 is a chart showing a reservation procedure for the communication band and its tear down procedure in a network according to this embodiment of the invention.

FIG. 9 is a chart showing a reservation procedure and its tear procedure of the communication band in the network in this embodiment. For example, each of a plurality of client terminals 200 transmits various data arising in daily business activities in the form of IP packets to the server 300, and the server 300 returns an answer to the client terminal 200 of source address of the IP packet, as needed. In order to transmit or receive such IP packets, a predetermined communication band is reserved in correspondence to the bi-directional transmission path between the edge routers 100 and 110.

At first, one edge router 100 generates a path message, and sends this path message to the other edge router 110, notifying through which path the specific IP packets subsequently arising are to be transmitted. This path message contains the traffic characteristic such as transmission rate (communication band) of packet. If this path message is received, the other edge router 110 generates a reservation message containing a demanded quality of service (communication band), and sends back this reservation message to one edge router 100. In the intermediate router 130 and the edge router 100 that have received this reservation message, the communication band is reserved based on the content of an RSVP object contained in this reservation message. In this way, the communication band in the unidirectional path from one edge router 100 via the intermediate router 130 to the other edge router 110 is reserved.

A similar reserving operation of the communication band is performed in a directional path from the other edge router 110 via the intermediate router 130 to one edge router 100. As a result, the communications channel can be secured in stable manner in the bi-directional path between the edge routers 100 and 110.

Thereafter, each of the edge routers 100, 110 transmits a specific IP packet subject to QoS assurance through a path having the communication band reserved, if the specific IP packet is input from any of the client terminals 200 or the server 300.

When the specific IP packet input from the client terminal 200 is interrupted, and there is no need of maintaining the reservation of the communication band, one edge router 100 generates a path tear message and sends it to the other edge router 110. The other router 110 generates a path tear message upon receiving this path tear message, and sends it back to one edge router 100. In this manner, the reserved communication band in unidirectional path from one edge router 100 via the intermediate router 130 to the other edge router 110 is torn down.

Also, a similar operation of tearing down the reserved communication band is performed in a directional path from the other edge router 110 via the intermediate router 130 to one edge router 100. As a result, the reserved communication band is torn down in the bi-directional path connecting the edge routers 100 and 110.

In this manner, in the network routing system according to the first embodiment of the invention, the communication band with the RSVP is reserved in the bi-directional path that is set between one edge router 100 and the other edge router 110. If a specific IP packet subject to QoS assurance is transmitted from the client terminal 200, one edge router 110 identifies this specific packet as other IP packet out of subject to QoS assurance which is transmitted from the client terminal 210, and transmits the specific packet via a specified path with the communication band reserved to the server 300. Similarly, the intermediate router 130 also transmits the specific IP packet passed from one edge router 100 via the specified path with the communication band reserved to the server 300.

The other edge router 110 receives the specific IP packet passed from the intermediate router 130 via a path with the communication band reserved, deletes the particular bit sequence contained in this specific IP packet and then transfers the specific IP packet obtained to the server 300 of destination address.

The communication band is reserved by transmitting or receiving an RSVP message between the edge routers 100 and 110, whereby a specific IP packet subsequently transmitted from each of a plurality of client terminals 200 can be transmitted to the server 300 via the path with the communication band reserved. Accordingly, the QoS for communication using a number of client terminals 200 can be readily secured. And each of the two edge routers 100, 110 may only generate, and transmit or receive an RSVP message which is relatively overload in the process, rather than each client terminal 200, so that it is possible to relieve the load required for the processing of RSVP message significantly. Since the particular bit sequence set in the edge router 100 is deleted before transmitting the IP packet from the edge router 110 to the server 300, it is possible to prevent the malfunction from being caused by this bit sequence.

Second embodiment

A network routing system according to a second embodiment of this invention will be described below.

Figure 10:
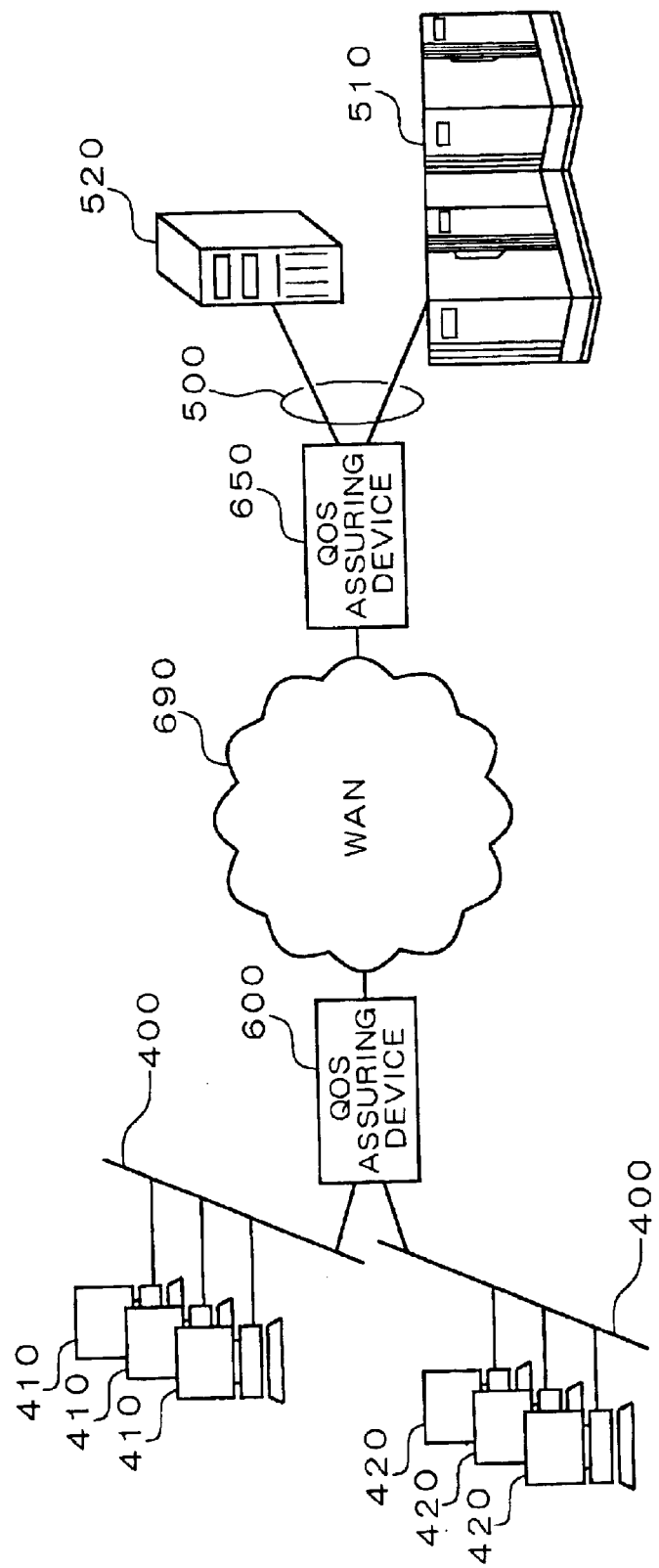
FIG. 10 is a schematic view illustrating the configuration of a company network according to a second embodiment of the invention.

FIG. 10 is a view illustrating the configuration of another company network. A company network as shown in FIG. 10 comprises a plurality of client terminals 410 and a plurality of information terminals 420 which are connected to an LAN 400, and a host computer 510 and an information server 520 which are connected to an LAN 500. The company network of this embodiment is configured by having a QoS assuring device 600 as a routing apparatus connected to the LAN 400 and a QoS assuring device 650 as a routing apparatus connected to the LAN 500 which are connected via a WAN (Wide Area Network) 690 constructed by a router network. A client terminal 410 and an information terminal 420 correspond to the first communication device; the host computer 510 corresponds to the second communication device; and the QoS assuring units 600, 650 correspond to the first and second routing apparatuses.

The client terminal 410 performs the data communication with regard to the basic business activities including the order entry or accounting that can directly contribute to the profits of the company. The information terminal 420 makes access to a company database or an out-of-company database connected to an out-of-company network such as a public Internet and provided by various servers to retrieve the data, or transmits or receives the electronic mail, or reads the home page.

The host computer 510 processes various kinds of data corresponding to the basic business activities which are input using the client terminal 410. The information server 520 comprises a variety of kinds of databases to retrieve the database in accordance with a retrieval instruction using the information terminal 420 and sends back its retrieval result to the information terminal 420.

As described above, since the client terminal 410 is used to input various kinds of data regarding the basic business activities including the order entry or accounting activities, the communication between each client terminal 410 and the host computer 510 requires a stable communication band to be secured with high QoS assurance. On one hand, various kinds of data necessary to retrieve a variety of kinds of databases contained in the information server 520 and notify their retrieval results are communicated between the information terminal 420 and the information server 520. However, there is no need of securing the stable communication band because some delay which may occur will not possibly greatly interfere with the business activities, and all one needs is to effect the best communication at the time of communication.

The QoS assuring device 600 implements the QoS assured communication between the client terminal 410 and the host computer 510 by reserving the network resource with respect to the other QoS assuring device 650. The other QoS assuring device 650 has the same configuration as the QoS assuring device 600.

Figure 11:
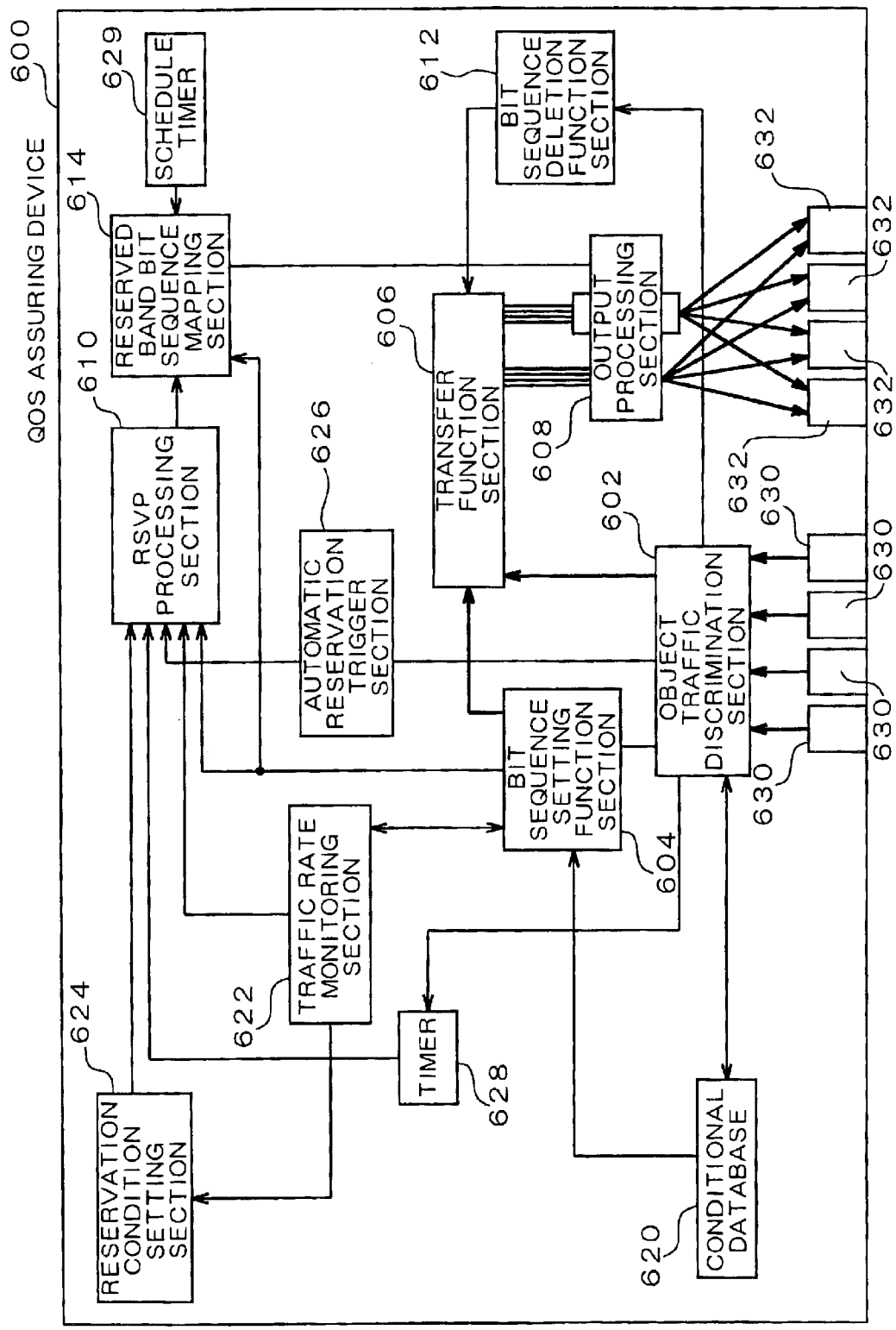
FIG. 11 is a diagram showing the configuration of a QoS assuring device.

FIG. 11 is a diagram illustrating the configuration of the QoS assuring device. In order to perform the QoS assurance operation, the QoS assuring device 600 as shown in FIG. 11 comprises an object traffic discriminating section 602, a bit sequence setting functional section 604, a transfer functional section 606, an output processing section 608, an RSVP processing section 610, a bit sequence deletion functional section 612, a reserved band bit sequence mapping section 614, a conditional database 620, a traffic rate monitoring section 622, a reservation condition setting section 624, an automatic reservation trigger section 626, a timer 628, a schedule timer 629, a reception interface 630, and a transmission interface 632.

The object traffic discriminating section 602 corresponds to packet classification processing unit; the bit sequence setting functional section 604 corresponds to bit sequence setting unit; the transfer functional section 606 and the output processing section 608 correspond to transfer processing unit; the RSVP processing section 610 corresponds to service quality set-up processing unit; the bit sequence deletion functional section 612 corresponds to bit sequence deleting unit; and the traffic rate monitoring section 622 corresponds to monitoring unit.

The object traffic discriminating section 602 discriminates the data subject to QoS assurance from among various kinds of data received by the receiving interface 630. For example, if a group of IP packets are input into the receiving interface 630, the groups of IP packets are classified into the IP packets that are subject to QoS assurance and the IP packets that are not subject to QoS assurance.

By the way, there are several ways in which the object traffic discriminating section 602 makes discrimination between the IP packets that are subject to QoS assurance and other IP packets. A way of discriminating the IP packets that are subject to QoS assurance will be described below.

(1) Using the destination address and destination network address

In a header part of the IP packet transmitted from the client terminal 410 to the host computer 510, an IP address of the host computer 510 is set as the destination address. Accordingly, the object traffic discriminating section 602 investigates the destination address contained in the header part of the input IP packet, and discriminates the IP packet as subject to QoS assurance in the case where this destination address is coincident with the IP address of the host computer 510.

The conditional database 620 stores the destination addresses required to identify the IP packet for subject to QoS assurance. If the first IP packet for subject to QoS assurance is detected, the address of the QoS assuring device corresponding to the destination address is desirably stored along with the destination address in the conditional database, because it is required to send a path message to the QoS assuring device (QoS assuring device 650 in this embodiment) destined for transmission. To make various sorts of information management efficiently, an initial value of the reserved band and a bit sequence to be set in the IP packets are desirably stored corresponding to the destination address.

Typically, a portion of the IP address contains the network address. For example, in the network of this embodiment as shown in FIG. 10, the destination address (IP address) in the header part of the IP packet transmitted from the host computer 510 to the client terminal 410 contains an address of the LAN 400 where the client terminal 410 is connected as a destination network address. Accordingly, for instance, in the case where the client terminal 410 for receiving the packets that are subjected to QoS assurance from the host computer 510 is only connected to the LAN 400, the object traffic discriminating section 602 for the QoS assuring device 650 can discriminate whether or not this IP packet is subject to QoS assurance, using the destination network address contained in a portion of this destination address, instead of examining the destination address contained in the header part of the IP packet, whereby there is eliminated the need of investigating the IP addresses for all the client terminals connected to the LAN 400 and the processing load of the apparatus can be reduced.

In this case, the destination network address is stored in the conditional database 620, in place of the destination address. If required, the address of the QoS assuring device that is the transmitting destination of the path message, the initial value of the reserved band, and the bit sequence set in the IP packet, are stored in correspondence to this destination network address.

(2) Using the transmission source address and transmission source network address As described above, whether or not the IP packet is subject to QoS assurance can be determined, using the destination address or the destination network address. On the contrary, it may be possible to determine whether or not the IP packet is subject to QoS assurance using the transmission source address.

That is, an IP address of the host computer 510 as the transmission source address is set in a header part of the IP packet transmitted from the host computer 510 to each client terminal 410. Accordingly, the object traffic discriminating section 602 within the QoS assuring device 650 disposed on the side of the host computer 510 investigates the transmission source address contained in the header part of the input IP packet, and can discriminate that the IP packet is subject to QoS assurance in the case where this transmission source address is matched with the IP address of the host computer 510.

For example, in the case where the client terminals 410 are only connected to the LAN 400, or where all the IP packets that the client terminals 410 transmit are subject to QoS assurance, the object traffic discriminating section 602 within the QoS assuring device 600 can discriminate whether or not this IP packet is subject to QoS assurance, using the transmission source network address contained in a portion of this transmission source address, instead of examining the transmission source address contained in the header part of the IP packet, whereby there is eliminated the need of investigating the IP addresses for all the client terminals connected to the LAN 400 and the processing load of the apparatus can be reduced.

(3) Using the protocol number

As shown in FIGS. 3 and 5, the IP header contains a value of identifying the protocol type for an upper layer (Layer 4). Accordingly, in the case where a protocol specialized for the basic service communication is used, the object traffic discriminating section 602 investigates the value of protocol type in the header part of the input IP packet, and can discriminate that this IP packet is subject to QoS assurance if this value of protocol type is matched with that of the IP packet subject to QoS assurance.

(4) Using the reception interface

As shown in FIG. 11, the QoS assuring device 600 in this embodiment has a plurality of (e.g., four) reception interfaces 630. For example, in the case where a reception interface 630 as a receiving section of the LAN 400 where the client terminals 410 are connected and a reception interface 630 as a receiving section of the LAN 400 where the information terminals 420 are connected are separately provided, the object traffic discriminating section 602 can discriminate whether or not the input IP packet is subject to QoS assurance by monitoring through which reception interface 630 the IP packet is passed.

(5) Using the destination port number

In the case where the IP packet is transmitted using the TCP/IP, whether or not the IP packet is subject to QoS assurance may be determined, using the destination port number contained in a TCP header. The destination port number in the TCP header of the packet that is transmitted from the client terminal 410 to the host computer 510 is set with a corresponding value of the particular service on an application layer. Accordingly, in the case where the particular service is supplied to the data of the IP packet subject to QoS assurance in the host computer 510, the object traffic discriminating section 602 can discriminate the IP packet subject to QoS assurance, using this destination port number. For example, in the case where SNA on TCP/IP is used as a protocol of the basic service communication, the destination port number is predetermined as 108 (SNA Gateway Access Server) and 1439 (/tcp Eicon X25/SNA Gateway). Also, in the case where FNA on TCP/IP is used, the destination port number is predetermined as 492/492 (Transport Independent Convergence for FNA). Accordingly, the destination port number, or the address of the QoS assuring device to which the path message is transmitted, the initial value of the reserved band, and the bit sequence set in the IP packet, as required, are stored in the conditional database 620, the discrimination of the IP packet to be assured or the setting of the destination to transmit the path message can be facilitated.

The bit sequence setting functional section 604 as shown in FIG. 11 sets a particular bit sequence in the header part of the IP packet subject to QoS assurance. This bit sequence setting functional section 604 involves fundamentally the same operation of the bit sequence as the bit sequence processing section 102 as shown in FIG. 2. That is, the bit sequence setting functional section 604 sets a particular bit sequence in the IP header of IPv4 by inserting this bit sequence into the type of service field or appending this bit sequence to this IP header. Also, the bit sequence setting functional section 604 sets a particular bit sequence in the IP header of IPv6 by inserting this bit sequence into the traffic class field or appending this bit sequence to this IP header.

The transfer functional section 606 performs, for an IP packet received by the reception interface 630, a routing process for determining a communication apparatus that becomes the next transmission destination in accordance with a destination address of the IP header. The output processing section 608 outputs the IP packets that have undergone the routing process performed by the transfer functional section 606, in a predetermined order, from the transmission interface 632. Since the IP packets that are subject to QoS assurance are transmitted in a reserved communication band, they are surely transmitted through the transmission interface not to abolish any packets.

The RSVP processing section 610 generates and transmits or receives various kinds of RSVP messages to reserve or tear down the communication band. Thereby, the specific IP packet is assured of QoS.

The reserved band bit sequence mapping section 614 performs the mapping from the particular bit sequence value which the bit sequence setting functional section 604 sets in the header part of the IP packet subject to QoS assurance onto the reserved band. For example, in the case where there are a plurality of kinds of IP packets that are subject to QoS assurance, and a separate communication band is required to be secured for each kind of IP packet, a different bit sequence is associated with each communication band. The reserved band bit sequence mapping section 614 stores not only the relation between the bit sequence set by the bit sequence setting functional section 604 within the QoS assuring device 600 for its own and the reserved band, but also the relation between the bit sequence set by the bit sequence setting functional section 604 within the QoS assuring device 650 for others and the reserved band, so as to know clearly the communication band for the IP packets that are subject to QoS assurance to be transmitted or received using the QoS assuring device 600.

By the way, for the bit sequence setting functional section 604 to set a plurality of bit sequences, there are several ways in which a bit sequence of random value is generated every time setting a new bit sequence is required, bit sequences are generated in ascending or descending order, or a bit sequence that is paired with an IP address of other QoS assuring device or a reserved communication band is registered and used as required. In the case where the bit sequence of random value is used, a plurality of bit sequences that have greatly different values can be generated simply. In the case where the bit sequences having the values in ascending or descending order are used, a plurality of bit sequences having different values can be generated by simple arithmetic operation. Further in the case where the bit sequence that is paired with the IP address of other QoS assuring device or the communication band to be reserved is registered and used as required, the simplification of the process can be effected because there is no need of generating the bit sequence at every time.

The reservation condition setting section 624 sets a parameter of the path message when the communication band is reserved. Generally, when the QoS on the traffic is assured using the RSVP, it is required that the data rate (band) on the traffic is specified by an RSVP path message on the side of the transmission source of data. For example, in the case where the data from the client terminal 410 to the host computer 510 is considered in this embodiment, the QoS assuring device 600 becomes the transmission source of data. Usually, in the basic service communication having a great number of client terminals or other client to server communication, the data rate for a total of data transmitted from each client terminal, or the rate of response data from the host computer is relatively stable, but is not completely constant, and varies. Thus, in the QoS assuring device 600 of this embodiment, the traffic rate monitoring section 622 monitors the data rate on the traffic that is intended for subject to QoS assurance, and when the data rate changes, transmits a new RSVP path message with a parameter corresponding to the data rate after being changed which is specified by the reservation condition setting section 624. Thereby, the reservation condition is changed to be matched with the actual data rate. In a process of the RSVP message, it is not preferable to change the reservation condition too frequently, because there is a great processing load on each QoS assuring device 600, 650 for transmitting or receiving this RSVP message. Therefore, for example, when a data rate change of 50 kbps from the previous time of reservation is detected, it is set that the reservation condition is changed.

Considering the operation of the actual system, it is necessary to determine at which timing start or tear up the reservation of network resources. For example, because when a network resource is reserved, this reserved communication band is not available to the data communications for other purposes, it is preferred that the reservation of network resources is effected at a timing when the transmission of IP packets that are subject to QoS assurance is started as actually as possible. In the case where none of the IP packets that are subject to QoS assurance are transmitted or received over a long time without interruption, it is desirable to free the network resource for other communication apparatus by tearing down the reservation of the communication band. In order to reserve or tear down the communication band at a suitable timing, an automatic reservation trigger section 626 and a timer 628 are provided.

The automatic reservation trigger section 626 instructs the RSVP processing section 610 to generate and transmit a path message, when an IP packet subject to QoS assurance is first input in a state where the communication band is not reserved.

The timer 628 starts to clock the fixed time every time an IP packet subject to QoS assurance is input. If this fixed time has elapsed before a next IP packet is input, the RSVP processing section 610 is instructed to generate and transmit a path cancellation message. If a next IP packet subject to QoS assurance is input within the fixed time, the timer 628 starts to clock the fixed time in synchronism with its input timing. Therefore, while an IP packet subject to QoS assurance is input within an interval of the fixed time, the RSVP processing section 610 is not instructed to generate the path cancellation message.

By the way, in the case where daily business hours are predetermined and an order entry activity frequently occurs within the daily business hours, the communication band may be automatically reserved at the business start time, and automatically torn down at the business end time. For this purpose, a schedule timer 629 is equipped.

The schedule timer 629 clocks a predetermined time length. When a first time is clocked, the RSVP processing section 610 is instructed to generate and transmit a path message, and when a second time is clocked, the RSVP processing section 610 is instructed to generate and transmit a path cancellation message.

In the case where the communication band is reserved on the traffic to transmit the IP packet from the client terminal 410 to the host computer 510, it is required at the same time that the communication band is reserved on the traffic to transmit the IP packet from the host computer 510 to each client terminal 410. In this way, by reserving the communication band for bi-directional traffic, the data from the client terminal 410 can be surely transmitted to the host computer 510, and an ACK (Acknowledge) corresponding to this data can be send back reliably.

For example, the automatic reservation trigger section 626 within the QoS assuring device 650 instructs the RSVP processing section 610 to generate and transmit a path message for other QoS assuring device 600 that is the source of this path message, when the path message is transmitted from the other QoS assuring device 600. In this way, the communication band for the bi-directional path (transmission path) is reserved.

As described above, if a network routing system is constructed using the QoS assuring device 600, 650 of this embodiment, it is possible to assure QoS of the IP packets transmitted from a designated client terminal 410 to the host computer 510 and the IP packets transmitted back from the host computer 510 to the client terminal 410. As a result, there IP packets are not abolished halfway, and the high quality communication can be implemented. When a first IP packet subject to QoS assurance is transmitted from the client terminal 410, the network resource (communication band) is reserved, or when no IP packet is transmitted for a certain time, the reserved network resource is torn down, whereby the network resources can be effectively utilized. Also since the network resource can be reserved automatically at a predetermined time interval in accordance with the business hours of the company, the QoS assurance in this time zone can be surely effected.

The present invention is not limited to the above-described embodiment, but various modifications may be made within the scope of the present invention as defined in the claims. For example, in the above-described embodiment, the network resource is reserved between two edge routers 100, 110, or between two QoS assuring devices 600, 650, but this invention may be applied to the WAN where three or more edge routers or assuring devices are provided.

FIG. 12 is a diagram illustrating the configuration of a network using five QoS assuring devices. The network as shown in FIG. 12 comprises a QoS assuring device 740 where a plurality of client terminals 710 are connected via a sub-network A, a QoS assuring device 742 where a plurality of client terminals 720 are connected via a sub-network B, a QoS assuring device 744 where a plurality of client terminals 730 are connected via a sub-network C, a QoS assuring device 760 where a host computer 750 is connected via a sub-network D, and a QoS assuring device 762 where a host computer 752 is connected via a sub-network E. The five QoS assuring devices 740, 742, 744, 760 and 762 are interconnected by the WAN 700.

FIG. 13 is a table showing the content of the conditional database contained in each QoS assuring device 740, 742, 744 to which the client terminals are connected. In accordance with the destination address of the IP packet, the QoS assuring device to transmit the IP address is designated. For example, a QoS assuring device 740 can know that this IP packet is subject to QoS assurance and the transmission destination of the IP packet and the path message is a QoS assuring device 762 in the case where the destination address contained in the header part of the IP address is an address of the host computer 752 when an IP packet is input from a client terminal 710 or other devices. In this way, even in the case where there are multiple transmission destinations of the IP packet subject to QoS assurance, with a QoS assuring device corresponding to each transmission destination, the QoS assuring device that is responsible for reservation of the communication band can be readily designated only by retrieving the conditional database.

FIG. 14 is a table showing the content of the conditional database contained in each QoS assuring device 760, 762 to which the host computer 750, 752 is connected. In accordance with the destination address of the IP packet, the QoS assuring device to transmit the IP address is designated. For example, a QoS assuring device 760 can know that this IP packet is subject to QoS assurance and the transmission destination of the IP packet and the path message is a QoS assuring device 744 in the case where the destination address contained in the header part of the IP address is an address of any client terminal 730 connected to the sub-network C when an IP packet is input from the host computer 750 or other devices.

As shown in FIG. 15, the conditional database may have the content as shown in FIG. 13 in addition to the initial value of the reserved band and the value of bit sequence. Similarly, as shown in FIG. 16, the conditional database may have the content as shown in FIG. 14 in addition to the initial value of the reserved band and the value of bit sequence.

Figure 17:
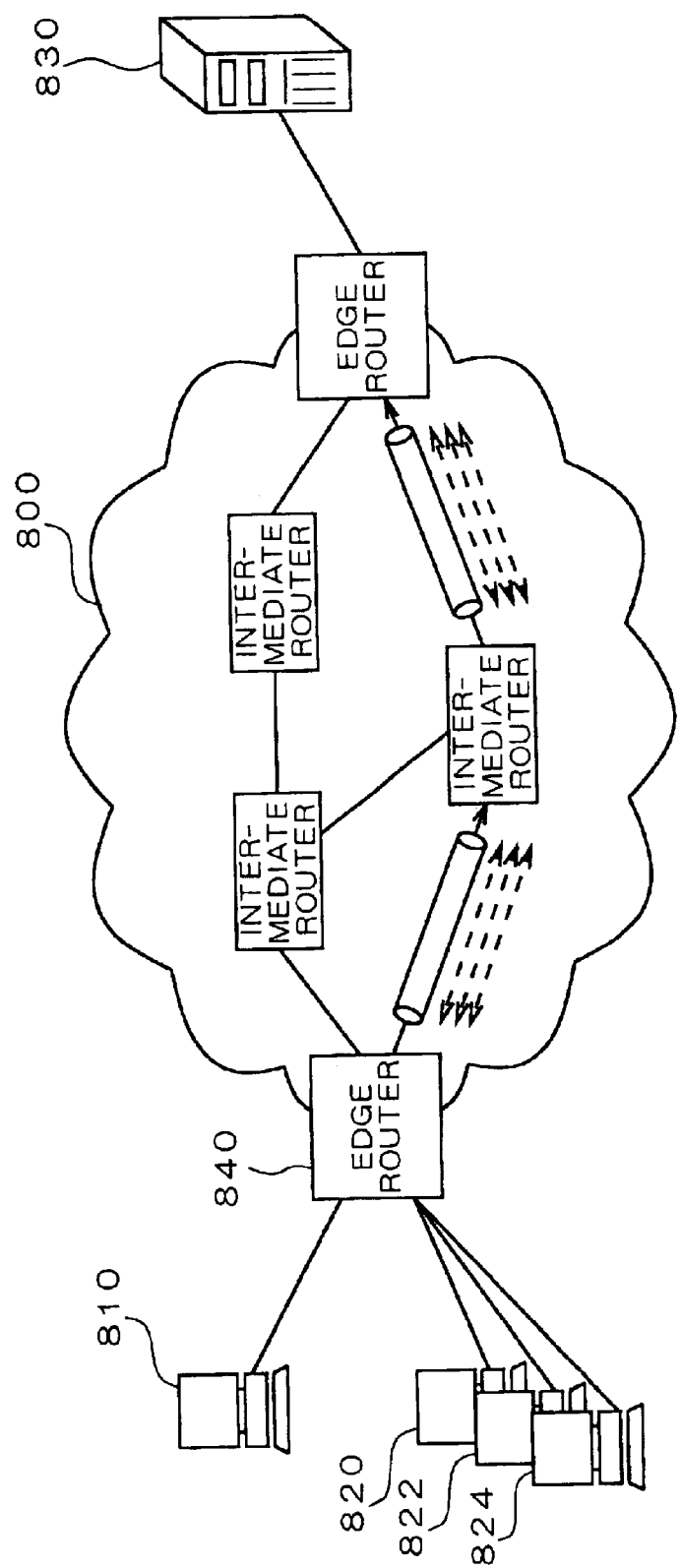
FIG. 17 is a schematic view illustrating the configuration of an ISP network to which the present invention is applied.

In the above-described embodiment, this invention is applied to a company network, but this invention may be applied to the ISP network, as shown in FIG. 17. In an example of FIG. 17, an ISP network 800 is constructed by a combination of the edge router and the intermediate router. A contract user can select either a first service of high rate of charge with QoS assurance or a second service of low rate of charge without QoS assurance. For example, a server 830 holds the WWW contents or broadcasts or distributes the motion picture or sound. The user making use of the first service makes dial-up connection using a client terminal 810, the edge router 840 to which the client terminal 810 is connected recognizes the access from the user who can use the first service through the user ID or password, and transfers a variety of kinds of motion picture or sound with the QoS assurance from the server 830 to the client terminal 810. Thereby, this contract user can receive a variety of kinds of services with the smooth sound or motion picture at low delay. On the other hand, the user who can use the second service has a low contract fee but if there are more accesses to the server 830, the service is delayed in distributing the sound or motion picture with low quality of communication.

Figure 18:
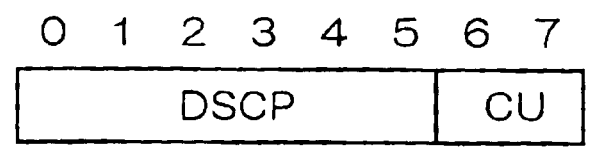

In the above embodiment, in the case where the particular bit information is inserted into the header part of the IP packet, the type of service field for the IP header of IPv4 or the traffic class field for the IP header of IPv6 is used, but these fields in Diffserv are defined as a DS field including a DSCP (Differentiated Service Codepoint) field and a CU (Currently Unused) field, as shown in FIG. 18 (RFC No. 2474). The bit sequence may be defined in accordance with the content of definition for the DS field using this format directly. Thereby, the network resources can be reserved with Diffserv in clear way, although this was conventionally impossible.

What is claimed is:

1. A network routing system in a network having a first routing apparatus to which one or more first communication devices are connected, and a second routing apparatus to which one or more second communication devices are connected, wherein said network routing system reserves a network resource using a service quality set-up protocol between said first routing apparatus and said second routing apparatus;

wherein said first routing apparatus comprises
first service quality set-up processing unit for reserving said network resource using said service quality set-up protocol;
first packet classification processing unit for classifying a specific packet that is to be transmitted using the reserved network resource from among a plurality of data packets transmitted from said first communication device;
bit sequence setting unit for setting a predetermined bit sequence for said specific packet classified by said packet classification processing unit; and
first transfer processing unit for transferring said specific packet having the bit sequence set by said bit sequence setting unit to said second routing apparatus, using said network resource corresponding to a content of the bit sequence contained in the specific packet; and wherein said second routing apparatus comprises:
second service quality set-up processing unit for reserving said network resource using said service quality set-up protocol;
second packet classification processing unit for classifying the specific packet having appended the bit sequence indicating transmission using said reserved network resource from among a plurality of input data packets;
bit sequence deleting unit for deleting the bit sequence contained in the specific packet classified by said packet classification processing unit; and
second transfer processing unit for transferring the data packet having the bit sequence deleted by said bit sequence deleting unit to said second communication device.

2. The network routing system according to claim 1, further comprising a third routing apparatus placed between said first and second routing apparatuses for routing the transmission of data packets, wherein said third routing apparatus comprises:
third service quality set-up processing unit for reserving a network resource using a service quality set-up protocol;
third packet classification processing unit for classifying the specific packet having appended the bit sequence indicating the transmission using said reserved network resource from among the input data packets; and
third transfer processing unit for transferring the specific packet classified by said third packet classification processing unit to said second routing apparatus, using said network resource corresponding to the content of the bit sequence contained in the specific packet.

3. The network routing system according to claim 1, wherein said service quality set-up protocol is a resource reservation protocol.

4. The network routing system according to claim 1, wherein said first service quality set-up processing unit transmits a service quality set-up protocol message having the bit sequence contained in an unused reserve area to said second routing apparatus to associate the traffic condition of said network resource reserved using the service quality set-up protocol with the bit sequence.

5. The network routing system according to claim 1, wherein said first service quality set-up processing unit transmits a service quality set-up protocol message having appended the bit sequence to said second routing apparatus to associate the traffic condition of said network resource reserved using the service quality set-up protocol with the bit sequence.

6. The network routing system according to claim 1, wherein said second service quality set-up processing unit checks to see whether or not the bit sequence is contained at a predetermined location of the service quality set-up protocol message transmitted from said first routing apparatus, and performs the operation in accordance with a normal service quality set-up protocol using said second routing apparatus, if the bit sequence is not contained.

7. The network routing system according to claim 2, wherein said third service quality set-up processing unit checks to see whether or not the bit sequence is contained at a predetermined location of the service quality set-up protocol message transmitted from said first routing apparatus, and performs the operation in accordance with a normal service quality set-up protocol using said third routing apparatus, if the bit sequence is not contained.

8. The network routing system according to claim 1, wherein when the specific packet is an IP packet in accordance with the Internet protocol version 4, the bit sequence is contained in the type of service field that is found in the header part of the IP packet.

9. The network routing system according to claim 1, wherein when the specific packet is an IP packet in accordance with the Internet protocol version 6, the bit sequence is contained in the traffic class field that is found in the header part of the IP packet.

10. The network routing system according to claim 1, wherein when the specific packet is an IP packet, the bit sequence is appended in the header part of the IP packet.

11. The network routing system according to claim 1, wherein said bit sequence setting unit sets a random value as the bit sequence.

12. The network routing system according to claim 1, wherein said bit sequence setting unit sets the value of the bit sequence in ascending order or descending order.

13. The network routing system according to claim 1, wherein said bit sequence setting unit sets the value of the bit sequence corresponding to an IP address of said second routing apparatus.

14. The network routing system according to claim 1, wherein said bit sequence setting unit sets the value of the bit sequence corresponding to a communication band of said network resource reserved by said first service quality set-up processing unit.

15. The network routing system according to claim 1, wherein said first packet classification processing unit classifies the specific packets, based on the destination address of the data packet transmitted from said first communication device.

16. The network routing system according to claim 1, wherein said first packet classification processing unit classifies the specific packets, based on the destination network address of the data packet transmitted from said first communication device.

17. The network routing system according to claim 1, wherein said first packet classification processing unit classifies the specific packets, based on the transmission source address of the data packet transmitted from said first communication device.

18. The network routing system according to claim 1, wherein said first packet classification processing unit classifies the specific packets, based on the transmission source network address of the data packet transmitted from said first communication device.

19. The network routing system according to claim 1, wherein said first packet classification processing unit classifies the specific packets, based on the destination port number of the data packet transmitted from said first communication device.

20. The network routing system according to claim 1, wherein said first packet classification processing unit classifies the specific packets, based on the protocol number of the data packet transmitted from said first communication device.

21. The network routing system according to claim 1, wherein said first packet classification processing unit classifies the specific packets, based on a reception interface of the data packet transmitted from said first communication device.

22. The network routing system according to claim 1, wherein said first routing apparatus has a conditional database containing information of combining the addresses of a plurality of second routing apparatuses and the destination addresses of the specific packets, in the case where there are the plurality of second routing apparatuses that are transmission destination of the specific packets, said first service quality set-up processing unit retrieves said conditional database, based on an address of the specific packet transmitted from said first communication device to designate said second routing apparatus that exists in front of the network connecting the communication devices that is the destination of the specific packet, and transmits a service assurance set-up protocol message to said second routing apparatus designated.

23. The network routing system according to claim 1, wherein said first routing apparatus has a conditional database containing information of combining the addresses of a plurality of second routing apparatuses and the destination network addresses of the network connected to said second routing apparatus, in the case where there are the plurality of second routing apparatuses that are transmission destination of the specific packets, said first service quality set-up processing unit retrieves said conditional database, based on the destination network address of the specific packet transmitted from said first communication device to designate said second routing apparatus that exists in front of the network connecting the communication devices that is the destination of the specific packet, and transmits a service assurance set-up protocol message to said second routing apparatus designated.

24. The network routing system according to claim 1, wherein said first routing apparatus has a conditional database containing information of combining the addresses of a plurality of second routing apparatuses and the destination port numbers of the specific packets, in the case where there are the plurality of second routing apparatuses that are transmission destination of the specific packets, said first service quality set-up processing unit retrieves said conditional database, based on the destination port number of the specific packet transmitted from said first communication device to designate said second routing apparatus that exists in front of the network connecting the communication devices that is the destination of the specific packet, and transmits a service assurance set-up protocol message to said second routing apparatus designated.

25. The network routing system according to claim 1, wherein said first routing apparatus has monitoring unit for monitoring the data rate of the specific packet, and said first service quality set-up processing unit changes the content of reserving said network resource, when a variation in data rate is detected by the monitoring operation of said monitoring unit.

26. The network routing system according to claim 1, wherein said first service quality set-up processing unit starts the reserving operation for the network resource, when the specific packet is first detected.

27. The network routing system according to claim 1, wherein said first routing apparatus has a timer for clocking a predetermined time, and said first service quality set-up processing unit initiates said timer when the last specific packet is detected, and tears down the reservation of said network resource when a predetermined time has elapsed before the next specific packet is detected.

28. The network routing system according to claim 1, wherein said first routing apparatus has a schedule timer for clocking a predetermined length of time, and said first service quality set-up processing unit reserves the network resource within the predetermined time.

29. The network routing system according to claim 1, wherein said second service quality set-up processing unit transmits a second service quality set-up protocol message to said first routing apparatus to reserve the network resource corresponding to the transmission path set from said second routing apparatus to said first routing apparatus, upon receiving a first service quality set-up protocol message for starting the reserving operation of the network resource from said first routing apparatus.

30. The network routing system according to claim 29, wherein said second service quality set-up processing unit transmits a second service quality set-up protocol message to said first routing apparatus in the case where the transmission source address of the first service quality set-up protocol message that has been received corresponds to said first routing apparatus.

31. The network routing system according to claim 29, wherein said second service quality set-up processing unit transmits a second service quality set-up protocol message to said first routing apparatus in the case where the first service quality set-up protocol message that has been received includes the same data as the bit sequence contained in the specific packet.

32. A routing apparatus comprising:

service quality set-up processing unit for reserving a network resource using a service quality set-up protocol;

packet classification processing unit for classifying a specific packet that is to be transmitted using the reserved network resource from among a plurality of data packets transmitted from one or more communication devices;

bit sequence setting unit for setting a particular bit sequence to the specific packet classified by said packet classification processing unit;

transfer processing unit for transferring the specific packet having the bit sequence set by said bit sequence setting unit using the network resource corresponding to the content of the bit sequence contained in the specific packet; and bit sequence deleting unit for deleting the bit sequence contained in a received specific packet when the specific packet containing the bit sequence is received, wherein said transfer processing unit transmits the specific packet having the bit sequence deleted to one of said communication devices.

33. The routing apparatus according to claim 32, wherein said service quality set-up protocol is a resource reservation protocol.

34. The routing apparatus according to claim 32, wherein said service quality set-up processing unit generates a service quality set-up protocol message having the bit sequence contained in an unused reserve area to associate the traffic condition of said network resource reserved using the service quality set-up protocol with the bit sequence.

35. The routing apparatus according to claim 32, wherein said service quality set-up processing unit generates a service quality set-up protocol message having appended the bit sequence to associate the traffic condition of said network resource reserved using the service quality set-up protocol with the bit sequence.

36. The routing apparatus according to claim 32, wherein said service quality set-up processing unit checks to see whether or not the bit sequence is contained at a predetermined location of the service quality set-up protocol message transmitted from the other device, and performs the operation in accordance with a normal service quality set-up protocol if the bit sequence is not contained.

37. The routing apparatus according to claim 32, wherein when the specific packet is an IP packet in accordance with the Internet protocol version 4, the bit sequence is contained in the type of service field that is found in the header part of the IP packet.

38. The routing apparatus according to claim 32, wherein when the specific packet is an IP packet in accordance with the Internet protocol version 6, the bit sequence is contained in the traffic class field that is found in the header part of the IP packet.

39. The routing apparatus according to claim 32, wherein when the specific packet is an IP packet, the bit sequence is appended in the header part of the IP packet.

40. The routing apparatus according to claim 32, wherein said service quality set-up processing unit starts the reserving operation for the network resource, when the specific packet is first detected.

41. The routing apparatus according to claim 32, further comprising a timer for clocking a predetermined time, wherein said service quality set-up processing unit initiates said timer when the last specific packet is detected, and tears down the reservation of said network resource when a predetermined time has elapsed before the next specific packet is detected.

42. The routing apparatus according to claim 32, further comprising a schedule timer for clocking a predetermined length of time, wherein said service quality set-up processing unit reserves the network resource within the predetermined time.

* * * * *